United States Patent Office 3,338,132
Patented Aug. 29, 1967

3,338,132
PICTURE PROJECTOR
Hans Rühle, Stuttgart, and Fritz Krumbein, Stuttgart-Moehringen, Germany, assignors to Zeiss Ikon Aktiengesellschaft, Stuttgart, Germany
Filed Sept. 8, 1965, Ser. No. 485,716
Claims priority, application Germany, Sept. 16, 1964, Z 11,075
5 Claims. (Cl. 88—24)

ABSTRACT OF THE DISCLOSURE

The invention comprises a projector casing having a projector objective and a projection lamp for illuminating a picture window, there being shaft means offset and parallel to the axis of the objective with a rotary filter on said shaft means to rotate in the light path of said projection lamp and impeller vanes on said filter element adapted to be rotated by means of an air stream created by a blower in the projector casing.

The invention relates to a picture projector in the projection light beam of which is arranged a heat protection filter between the picture plane and the source of light.

Such heat protection filters have the purpose to protect in a slide projector the picture transparency and in a motion picture projector the motion picture film against heat rays which constitute a considerable portion of projection light beam. The thermic load to which the filter is subjected in this arrangement has the result that the filter is soon destroyed or is made ineffective because the filter layer disintegrates under the influence of the heat.

It is an object of the invention to decrease the thermic load on simple filters by causing the filter to rotate in the projection light beam. This movement of the filter has the result that no heat can accumulate in front of the filter or at least such a heat accumulation is reduced since the movement of the filter effects a circulation of any heat which tries to accumulate, so that always fresh cool air is supplied. This advantage is already very noticeable if the filter has a diameter which is approximately equal to the diagonal of the customary rectangular picture window, so that the total surface of the filter is subjected to heat radiation.

It is another object of the invention to improve this arrangement by making the diameter of the filter a multiple of the diagonal dimension of the picture window and by arranging the axis, about which the filter is rotatable, outside of the picture window. In such an improved arrangement only small surface areas of the filter disc are subjected to the heat rays, and these areas, during the rotation of the filter, will then be cooled as soon as they come to lie outside of the projection light beam, so that the total thermic load of the filter is reduced to such an extent that even absorption filter may be used as heat protection filter.

Still another object of the invention is to rotatably mount the rotary filter disc on a rotary shaft which is already provided in the picture projector, for instance on the drive shaft for the rotary shutter in a motion picture projector.

Since the thermic relief of the filter disc is a maximum when the filter disc rotates slowly, it is advisable when a positive drive is selected for the filter disc to employ a suitable drive shaft of the projector in connection with a step-down gearing for driving the filter disc.

Such a special drive for the heat protection filter may be omitted when the latter is provided on its circumference with a sheet metal rim provided with vanes which are arranged in such a manner that they project into the air stream which either is produced on account of the thermic effect of the source of light or is produced by a cooling blower or which air stream is conducted toward the heat protection filter by suitable guides.

With these and other objects in view, as will appear hereinafter, an example of a picture projector of the invention will now be described in greater detail with reference to the accompanying drawing in which.

Figure 1:
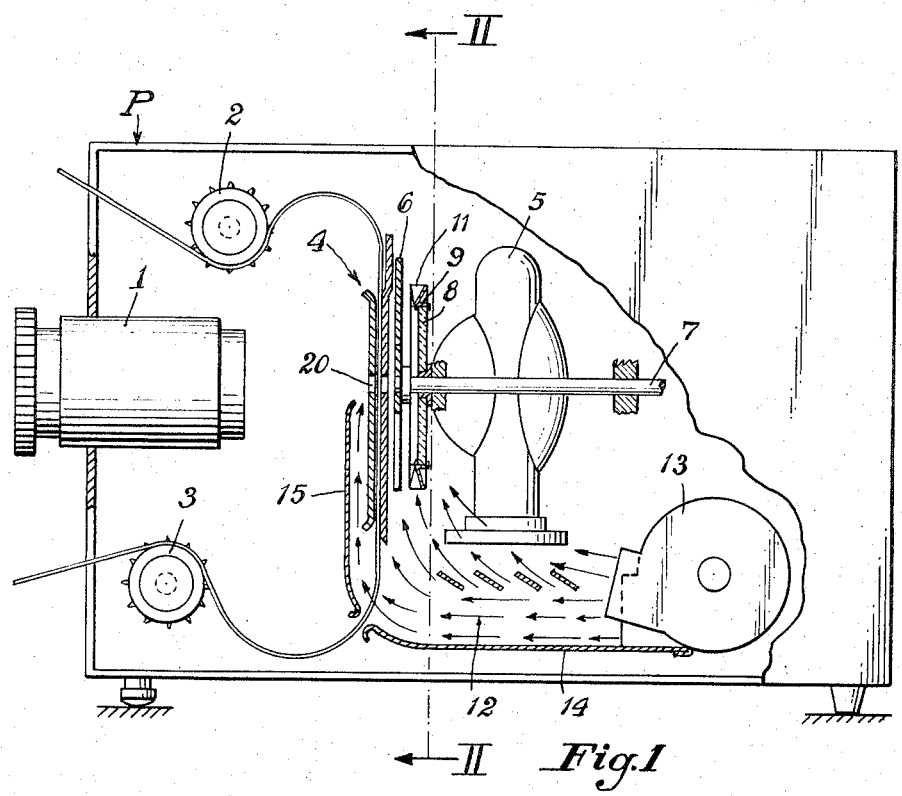
FIG. 1 is a side elevation view of a picture projector, whereby parts of the housing are broken away to illustrate the interior parts.
Figure 2:
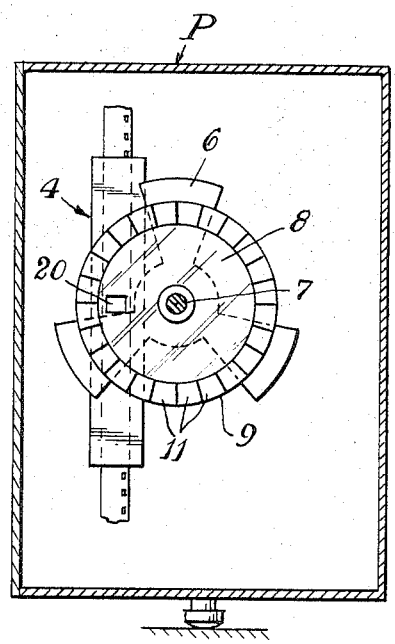
FIG. 2 is a cross-sectional view along the line II—II of FIGURE 1.
Figure 3:
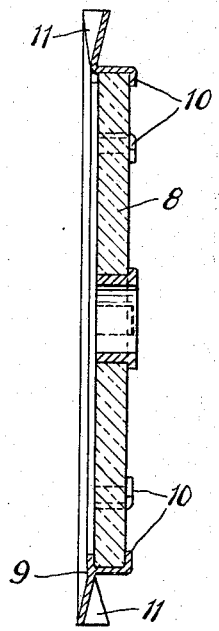
FIG. 3 is a diametrical sectional view of the heat protection filter.

Referring to the FIG. 1, the picture projector P is provided with a projection objective 1, a feed sprocket 2, a bottom sprocket 3, a picture window guide 4 with a rectangular picture window 20 and a projection lamp 5. The rotary shutter 6 is mounted on a horizontally disposed drive shaft 7 arranged in spaced parallel relation to the optical axis of the objective. The shaft 7 is driven by a prime mover which is not illustrated but is of conventional form. The heat protection filter disc 8 is freely rotatably mounted on this shaft 7 directly in rear of the picture window guide 4. The heat protection filter disc 8 (FIGS. 2 and 3) is of circular shape and is arranged in an annular mount 9 provided on its circumference with uniformly distributed brackets 10 which secure the circular disc 8 in the mount 9. The mounting ring 9 is also provided with a number of vanes 11 which extend radially outwardly and are uniformly distributed along the circumference of the mount 9. The heat protection filter disc 8 is rotatably mounted on the shaft 7 and is caused to rotate by the effect of a cooling air stream 12. This cooling air stream 12 is produced by a suitably arranged blower 13 mounted in the housing of the projector P. In addition to this cooling air stream 12, there may be employed for a thermic relief additional parts of the projector, such as suitable guides 14, 15 which conduct the cooling air stream into the neighborhood and around the heat protection filter 8.

What we claim is:
1. In a picture projector having a projection lamp and a picture window illuminated by a light path from said lamp, comprising shaft means, a mount freely rotatable on said shaft means, a circular filter carried by said mount and arranged between said projection lamp and picture window with its axis extending parallel to the direction of said light path, a series of outwardly extending impeller vanes on the periphery of said mount, and means associated with said projector for creating an air flow pathway directed toward said vanes.

2. In a picture projector having a picture window illuminated by a projection lamp, comprising support means, a rotary shaft carried by said support means with its axis offset and parallel with respect to the optical axis of said projector, a continuous circular filter in said filter mount to rotate therewith, a series of outwardly extending circumferentially spaced impeller vanes on said mount, means associated with said projector for creating an air flow pathway to impinge upon said impeller vanes and rotate said circular filter continuously, said heat protection filter having a diameter in excess of the diagonal dimension of said picture window.

3. In a picture projector having a projection lamp and a picture window illuminated along the optical axis of said projector, comprising a rotary mount supported for rotation about an axis offset from said optical axis and parallel therewith, shaft means, a rotary shutter on said shaft means for interrupting the illumination of said picture window, said rotary mount being supported on said shaft means for free rotation thereon, a heat projection filter carried by said mount to rotate in a plane perpendicular to the optical axis of said projector, a series of outwardly extending impeller vanes on said mount, and means associated with said projector for creating an air flow pathway impinging upon said impeller vanes.

4. A picture projector having a projection lamp and picture window with a rotary shutter mounted on a drive shaft to rotate said shutter adjacent said window whereby light rays will be interrupted from said projection lamp to intermittently illuminate said window, comprising a filter mount disc rotatably supported for free rotation on said drive shaft, a heat protection filter element carried by said mount and extending in a plane perpendicular to said optical axis, a series of circumferentially spaced impeller vanes mounted on the periphery of said mount, a blower in said projector to create an air stream adapted to impinge upon said impeller vanes and rotate said heat protection filter in the path of illumination from said projection lamp.

5. In combination with a picture projector having a casing, projector objective in said casing to form an optical axis along said casing with a projection lamp for illuminating a picture window in said casing, consisting of shaft means mounted offset and parallel to the optical axis, a rotary shutter mounted on said shaft means to rotate therewith adjacent said picture window, and a filter mount rotatably supported on said shaft means to rotate independently thereof, a continuous circular heat protection filter carried by said mount to move in the path of light rays from said projection lamp in the direction of said objective along the axis thereof, a series of equidistantly spaced radially extending vanes on the periphery of said mount forming impeller surfaces, and a blower in said casing for directing a stream of air along a predetermined pathway to impinge against said impeller surfaces and rotate said filter mount and heat protection filter.

References Cited

UNITED STATES PATENTS

| | | | |
|---|---|---|---|
| 1,385,162 | 7/1921 | Tillyer | 88—24 XR |
| 1,609,961 | 12/1926 | Readeker | 352—149 |
| 2,441,313 | 5/1948 | Fairbanks | 352—202 XR |
| 2,521,851 | 9/1950 | Johnson | 240—10.1 |

FOREIGN PATENTS 218,382  11/1961  Austria.

NORTON ANSHER, *Primary Examiner.*

D. L. JACOBSON, *Assistant Examiner.*